United States Patent
Linnartz et al.

(10) Patent No.: US 10,602,575 B2
(45) Date of Patent: Mar. 24, 2020

(54) CURRENT MODULATION CIRCUIT, A DRIVING CIRCUIT, AND A METHOD FOR DRIVING A LIGHTING LOAD WITH CURRENT MODULATION

(71) Applicant: SIGNIFY HOLDING B.V., Eindhoven (NL)

(72) Inventors: Johan-Paul Marie Gerard Linnartz, Eindhoven (NL); Kumar Arulandu, Eindhoven (NL); Aleksandar Sevo, Eindhoven (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/341,913

(22) PCT Filed: Oct. 11, 2017

(86) PCT No.: PCT/EP2017/075929
§ 371 (c)(1),
(2) Date: Apr. 14, 2019

(87) PCT Pub. No.: WO2018/073069
PCT Pub. Date: Apr. 26, 2018

(65) Prior Publication Data
US 2019/0246465 A1    Aug. 8, 2019

(30) Foreign Application Priority Data
Oct. 21, 2016  (EP) ..................................... 16195066

(51) Int. Cl.
*H05B 33/08* (2020.01)
*H05B 37/02* (2006.01)
(Continued)

(52) U.S. Cl.
CPC .......... *H05B 33/0812* (2013.01); *H02M 1/08* (2013.01); *H02M 1/14* (2013.01);
(Continued)

(58) Field of Classification Search
CPC ............ H05B 33/0815; H05B 33/0851; H05B 33/083; H05B 37/0218; H05B 37/0263;
(Continued)

(56) References Cited

U.S. PATENT DOCUMENTS

| 9,867,240 B2 * | 1/2018 | van den Broeke ..... H02M 1/08 |
| 10,038,502 B1 * | 7/2018 | Seki ..................... H04B 10/116 |

(Continued)

FOREIGN PATENT DOCUMENTS

| EP | 2547174 A2 | 1/2013 |
| FR | 3019268 A1 | 10/2015 |

*Primary Examiner* — Vibol Tan
(74) *Attorney, Agent, or Firm* — Daniel J. Piotrowski

(57) ABSTRACT

The invention provides a current modulating circuit, for example for use in a driving circuit for driving a lighting load such as an LED arrangement. A current modulating element is provided in series with the lighting load, and modulates the current based on a data input signal. A feedback system controls the current modulating element, and it has a first feedback control path which uses a voltage across the current modulating element, and a second feedback control path which uses the data input signal. The voltage feedback is used to maintain the overall current equal to the current output from a driver. The difference in current is taken up by a capacitor at the output of the driver.

13 Claims, 5 Drawing Sheets

(51) Int. Cl.
*H02M 1/00* (2006.01)
*H04B 10/116* (2013.01)
*H02M 1/08* (2006.01)
*H02M 1/14* (2006.01)

(52) U.S. Cl.
CPC ....... *H04B 10/116* (2013.01); *H05B 33/0803* (2013.01); *H05B 33/0815* (2013.01); *H05B 37/0218* (2013.01); *H05B 37/0263* (2013.01); *Y02B 20/345* (2013.01)

(58) Field of Classification Search
CPC ............ H05B 37/0272; H05B 33/0848; H05B 33/0812; H05B 33/0887; H05B 33/0842; H05B 33/0845; H05B 33/0866; G05F 1/575; G06G 7/186; H03F 2200/171; H03F 2200/351; H03F 2200/78; H03F 3/185; H03F 3/2171; H02M 1/08; H02M 1/14
See application file for complete search history.

(56) References Cited

U.S. PATENT DOCUMENTS

| | | | | |
|---|---|---|---|---|
| 10,244,609 | B2 * | 3/2019 | Siessegger | H05B 33/0803 |
| 10,306,722 | B2 * | 5/2019 | Lai | H05B 33/0845 |
| 10,310,528 | B1 * | 6/2019 | Elsayed | G05F 1/565 |
| 2013/0038300 | A1 * | 2/2013 | Yanagida | H02M 3/1563 |
| | | | | 323/271 |
| 2013/0093404 | A1 * | 4/2013 | Park | H02M 1/32 |
| | | | | 323/273 |
| 2013/0328496 | A1 * | 12/2013 | Chen | H05B 37/0281 |
| | | | | 315/224 |
| 2015/0115809 | A1 * | 4/2015 | Siessegger | H05B 33/0803 |
| | | | | 315/185 R |
| 2015/0289325 | A1 * | 10/2015 | Szolusha | H05B 33/08 |
| | | | | 315/201 |
| 2017/0006675 | A1 * | 1/2017 | van den Broeke | H02M 1/08 |
| 2017/0279421 | A1 * | 9/2017 | Togawa | H03F 3/185 |

* cited by examiner

CURRENT MODULATION CIRCUIT, A DRIVING CIRCUIT, AND A METHOD FOR DRIVING A LIGHTING LOAD WITH CURRENT MODULATION

CROSS-REFERENCE TO PRIOR APPLICATIONS

This application is the U.S. National Phase application under 35 U.S.C. § 371 of International Application No. PCT/EP2017/075929, filed on Oct. 11, 2017, which claims the benefit of European Patent Application No. 16195066.2, filed on Oct. 21, 2016. These applications are hereby incorporated by reference herein.

FIELD OF THE INVENTION

This invention relates to the communication of data by encoding a light output.

BACKGROUND OF THE INVENTION

Visual light communication systems are known, in which LEDs are used to transmit data. Fast variations of the LED current are provided, which give rise to a varying light output, which conveys a data stream. The light fluctuations may be sufficiently rapid to avoid any visual light flicker. In this way, lighting components may communicate with each other or with a central system controller, for example to transmit sensor data wirelessly from a luminaire to a central controller.

There is a need for a suitable circuit that can be used to modulate the LED current (or the current of any other current-drive lighting load) with data. However, a standard off-the-shelf driver delivers a constant AC current. This makes it difficult to modulate the current through the LED in order to provide the desired modulated light output.

FIG. 1 shows in schematic form three possible general approaches for providing a modulated output current to an LED load 10.

A first approach is to achieve current modulation based on modified control of the main driver, which is typically a switch mode power converter. An analogue input voltage "Vref" or else a digital pulse width modulation disable signal "PWM disable" controls a transmission gate 12 at the output of the driver. This works well for slow data, for example data at less than 20 kbits/second, corresponding to the switching frequency of the switch mode power converter.

A second approach is to use a parallel shunt 14. This turns off the LED by providing a bypass for the LED current. This can waste a substantial amount of energy.

A third approach is to use a linear modulator 16. This provides a current modification by controlling a transistor which functions as a current regulator in series with the LED load 10. This is a more power-efficient solution.

The output of the driver has an output capacitor. For the first and second approaches above, the output capacitor should be very small, whereas for the third approach, it should be very large.

Implementation of a linear modulator is possible for a driver which delivers an output voltage. In this case, the linear modulator functions as a current control element for controlling the current between fixed voltage rails. For example, it comprises a MOS transistor with a controlled source-drain current. The resulting current flowing may be used as a feedback control parameter to control the modulation function.

However, standard LED drivers deliver a regulated current rather than voltage. There is then incompatibility between the main driver regulated output current and the local current control.

In particular, a current-regulating LED driver in series with a current-modulating transistor is known to be difficult to control. Basically, the circuit comprises two current sources in series: the LED driver which is the source and the current modulator that acts as the load. With a minor mismatch between these two currents, clipping of the modulation current may occur or a rapid escalation of output voltage of the driver may occur that also causes dramatic power losses in the current modulator.

EP 2 547 174 shows the use of a linear modulator according to the third approach wherein a current feedback loop is provided to the driver for maintaining a constant average current in the LEDs. The feedback loop of EP 2 547 174 comprises a low pass filter in such a way that the modulated current is minimized in the feedback loop. Such feedback loop does not compensate a possible drift in the output voltage of the driver because it only takes into account the average current.

Other modulation possibilities are shown in US 2015/0115809 but none of them indicates how to compensate the voltage drift at the output of a standard current driver when a modulating element is serially mounted with the LEDs.

There is therefore a need for a circuit design which enables the efficiency benefits of a linear modulator to be obtained, but which also allows a standard and hence low cost regulated current driver to be used.

SUMMARY OF THE INVENTION

The invention is defined by the claims.

According to examples in accordance with an aspect of the invention, there is provided a current modulator circuit for modulating a drive current through a lighting load, comprising:

a current modulating element for modulating the light output of the lighting load based on a data input signal, wherein the current modulating element is adapted to be connected in series with the lighting load; and a feedback system for controlling the current modulating element thereby to implement modulation of the current through the lighting load, wherein the feedback system comprises a first feedback control path and a second feedback path. The first feedback path has as input a voltage across the current modulating element and comprises a comparator arrangement a low pass filter. The comparator arrangement is connected for comparing a measured voltage across the modulating element with a reference voltage. The low pass filter is placed between an output of the current modulating element and a control input of the current modulating element. The second feedback control path has as input the data input signal.

This modulator circuit provides two feedback control paths. One operates at a relatively low frequency, for example at DC, and the control is based on a voltage across the current modulating element. The average DC voltage obtained by low pass filtering is representative of the average voltage at the output of the driver. This voltage feedback thus stabilizes the general steady state operating conditions of the current modulating element. The second feedback path operates provides the data modulation. In this way, a compensation can be made on the modulating current to match a constant input current provided by the driver for preventing voltage drift.

The current modulating element for example comprises a transistor (such as a MOSFET, other type of FET or other type of transistor) or any other controllable semiconductor device.

The feedback based on the voltage across the current modulating element aims to keep the current modulating element in a well-defined operational mode, while at the same time keeping the losses low.

An error between the supply current to the current modulating circuit and the average current through the current modulating element can be measured over an integrated time as a voltage difference between an operating voltage of the current modulating circuit and the lighting load voltage. A voltage drop provides headroom for the current modulating element to regulate the average current and the modulation current. Too little voltage headroom will deteriorate the modulation current and too high headroom voltage will result in excessive power losses.

Alternatively, to tolerate dimming based on controlling the current intensity and/or the aging of the (typically electrolytic) capacitor (a capacitance decrease increases the voltage peak-to-peak amplitude), which both have an influence on the operation of the current modulating element, a lowest voltage can be monitored and used as a feedback signal. In this way, the voltage across the current modulating element takes a dynamic value which depends on the nature of the lighting load.

The invention is thus based on controlling a low frequency (e.g. DC average) voltage of the current modulating element or controlling a peak (e g minimal) voltage to be equal to a reference control voltage. An AC (high frequency) current through the LED load (equal to the current through the current modulating element) is controlled in proportion to the modulating data signal.

The first feedback control path (e.g. DC control loop) for example comprises an operational amplifier, for example including an integrator function and proportional-integral control, to measure and regulate the voltage across the current modulating element towards a reference voltage. As mentioned above, the measured voltage is for example the average voltage across the current modulating element or it may be a peak voltage across the current modulating element, in particular the minimum peak voltage across the current modulating element.

The requirements for the average voltage drop across the current modulating element strongly depends on the V-I characteristics of the lighting load (which varies for different lighting load types) and the configuration of the lighting load such as the number of lighting elements in series and parallel, as well as average current and modulation depth.

The minimum peak voltage provides a measure of the headroom provided by the current modulating element. By ensuring this is at a low level, the efficiency of the system is improved by maintaining low losses.

By way of example, the ESR (equivalent series resistance) of LEDs is dependent on the drive current: typically the ESR increases at lower current levels e.g. when dimming the luminaire. Optimization of the modulation efficiency requires a minimum average voltage drop across the modulator and a minimum voltage across the modulator is required to ensure that the modulation signal does not get distorted. For the modulator to be flexible with respect to the lighting load type and configuration, the drive current needs the ability to adapt its average voltage drop in order to improve efficiency. For this reason, a good input signal to control the average voltage drop across the modulator in a dynamic way is indeed the minimum voltage across the modulator (so that it never gets saturated).

The current modulating element for example comprises a transistor as explained above and the reference voltage is then selected such that the transistor operates in the linear mode but close to the limit of saturation. This provides efficient operation of the circuit.

The feedback system may comprise a filter between an output of the current modulating element and a control input of the current modulating element. This is used to enable control based on the DC current flowing. For this purpose, the filter for example comprises a low pass filter. It may be implemented as a proportional-integral filter.

The data input signal may be provided to one terminal of the filter. This provides a joint high frequency (AC) and low frequency (DC) control loop. The first (DC) feedback control path is based on a voltage associated with the current modulating element, and the second (AC) feedback control path is implemented by injecting the data input signal. This provides a closed loop AC control.

Alternatively, an AC control loop may be based on measurement of the current through the current modulating transistor, wherein the current through the current modulating transistor is compared with the data input signal, and the result is provided to one terminal of the low pass filter through a high pass filter. The high pass filter operates at a higher frequency than the low pass filter.

This provides separate closed loop AC and DC control loops for the low frequency and high frequency feedback control paths.

The AC control loop may furthermore include an input signal based on measurement of the optical output of the LED load. This enables different optical efficiencies to be taken into account.

The modulator can also be designed such that it suppresses a mains ripple that usually appears at the output of a single stage LED driver. To do so, the LED current can be measured and fed through a filter and then be applied to the modulator input signal.

The invention also provides a driving circuit for driving a lighting load, comprising:

a driver for delivering a controlled current between first and second driver output terminals;

an output capacitor connected between the first and second driver output terminals;

a current modulator circuit as defined above; and first and second driving circuit outputs, for connection to a lighting load.

This circuit makes use of a capacitor to enable the output current from the driver and the current through the lighting load to differ over short time scales, but the average current over time is the same. The current modulating element thus delivers an average current which is equal to the delivered current by the driver. The variation is a superimposed modulated current on top of the average current. The feedback system ensures the average currents remain equal.

The first feedback control path sets the operating point for the current modulating element, and provides a match between the overall driver current and the lighting load integrated current over time. The second feedback control path implements the data modulation, and the fluctuations between the driver current and the lighting load current result in charge flow to and from the capacitor.

The invention also provides a lighting circuit comprising:
a driving circuit as defined above; and a lighting load driven by the driving circuit.

The lighting load preferably comprises an LED arrangement comprising series and/or parallel LEDs.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a current modulating circuit, for example for use in a driving circuit for driving a lighting load such as an LED arrangement. A current modulating element is provided in series with the lighting load, and modulates the current based on a data input signal. A feedback system controls the current modulating element, and it has a first feedback control path which uses a voltage across the current modulating element, and a second feedback control path which uses the data input signal. The difference in current is taken up by a capacitor at the output of the driver. The voltage feedback is used to avoid a drift of the voltage across the capacitor at the output of the driver while the average current is maintained close to the current outputted by the driver.

Figure 1:
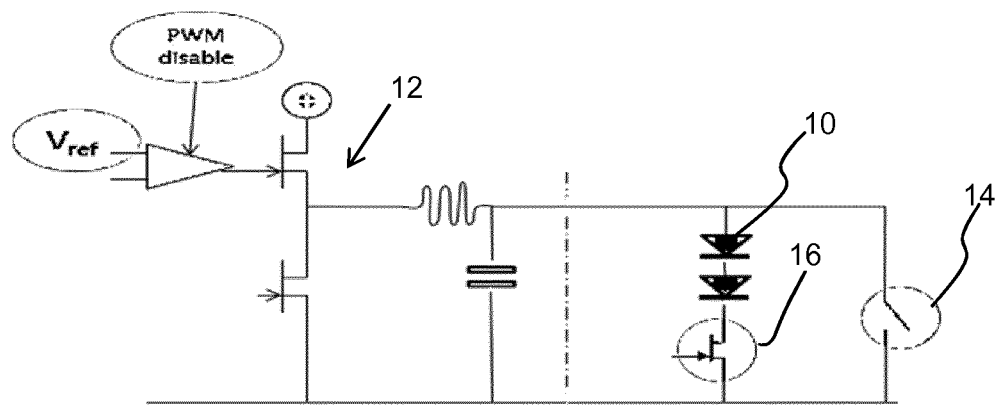
FIG. 1 shows in schematic form three possible general prior art approaches for providing a modulated output current to an LED load.
Figure 2:
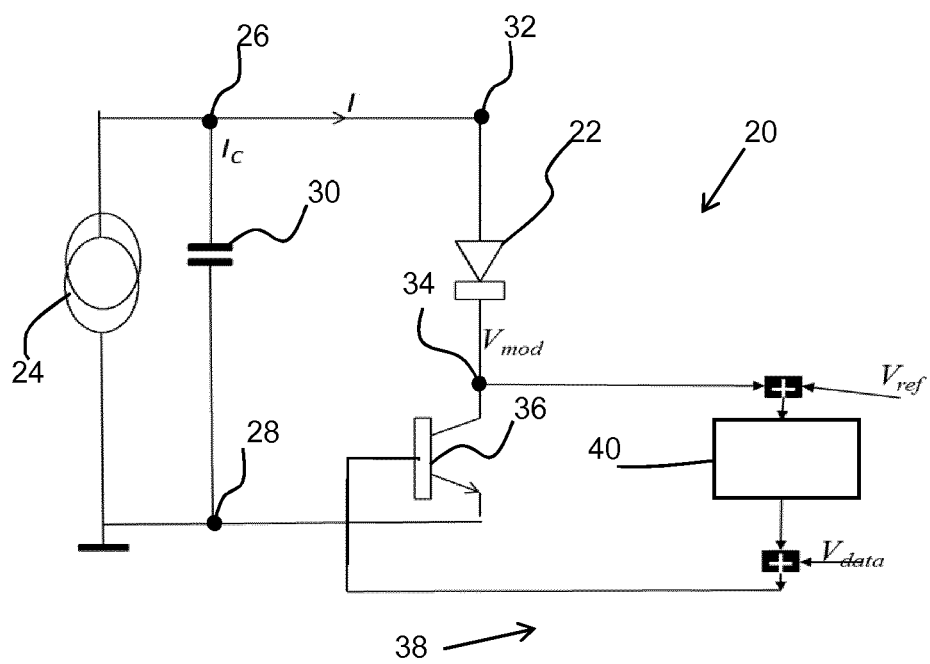
FIG. 2 shows a first design of a driving circuit for applying light modulation.

FIG. 2 shows a driving circuit 20 for driving a lighting load such as an LED load 22. The driving circuit 20 is all parts shown in FIG. 2 apart from the LED load 22.

An LED driver is shown as a current source 24, which represents a (typically switch mode) power supply which delivers a controlled current between first and second driver output terminals 26, 28. These output terminals connect to a current modulator circuit for controlling the current supplied to the LED load.

An output capacitor 30 is connected between the first and second driver output terminals 26, 28 and it absorbs or delivers current so that the driver output current may be constant even while the load current varies.

The circuit 20 has first and second driving circuit outputs 32, 34, for connection to the LED load 22.

A current modulating element 36 in the form of a transistor, such as a bipolar, or field effect transistor, and in particular a MOSFET, is in series with the LED load 22. It is provided for modulating the light output of the LED load 22 based on a data input signal Vdata. The first driving circuit output 32 is connected to the first driver output terminal 26, and the second driving circuit output 34 is connected to the second driver output terminal 28 through the current modulating transistor 36. The transistor 36 may instead be at the high side (so that the terminal 28 may instead be considered to be the "first" driver output terminal).

A feedback system 38 is provided for controlling the current modulating transistor 36 thereby to implement modulation of the current through the LED load 22. The feedback system 38 comprises a first input Vmod of a voltage across the current modulating transistor 36, and a second input of the data input signal Vdata. These two inputs implement separate feedback control paths, which operate at different frequencies. One control path is a low frequency steady state control path and the other is a high frequency data modulation control path.

The operating range of the transistor 36 is for example guaranteed by controlling the average voltage across the source-drain of the transistor. A current difference between the supply current of the LED driver 24 and the average current through the transistor 36 is monitored over time based on the voltage difference between the LED driver output 26, 28 and the LED voltage.

The voltage drop across the transistor 36 provides headroom for the transistor to regulate both the average current and also the modulation current. Too little voltage headroom will deteriorate the modulation current and too high headroom voltage will result in excessive power losses.

Instead of monitoring an average voltage (resulting from an average current) through the transistor, the voltage resulting from the highest current may be monitored. This corresponds to the lowest voltage. This enables the system to tolerate current intensity dimming, wherein the current dimming shifts down the average voltage. Similarly, the aging of the electrolytic capacitor 30 may be compensated. These both have an influence on the transistor operation.

The feedback system 38 includes a filter 40, in particular a low pass filter so that only the slow average voltage variations (in the voltage Vmod across the transistor) are used as feedback parameter. The low pass filter may comprise a proportional-integral (PI) filter. The filter is between an output (e.g. drain) of the current modulating transistor 36 and a control input (e.g. gate) of the current modulating transistor 36.

The circuit of FIG. 2 has a single loop which combines the two feedback control paths. The filter 40 implements a DC feedback control path, and the data input signal Vdata is provided to one terminal of the filter and thereby adds an AC control path to the single loop. In the control loop, a first difference voltage between the measured voltage Vmod and a reference voltage Vref is generated using an adder (with negative input for Vmod, i.e. a subtractor/comparator implemented using an operational amplifier) and the data voltage Vdata is added into the control loop.

There may instead be two distinct control loops to implement the AC feedback control path (Vdata) and the DC feedback control path (Vref).

Figure 3:
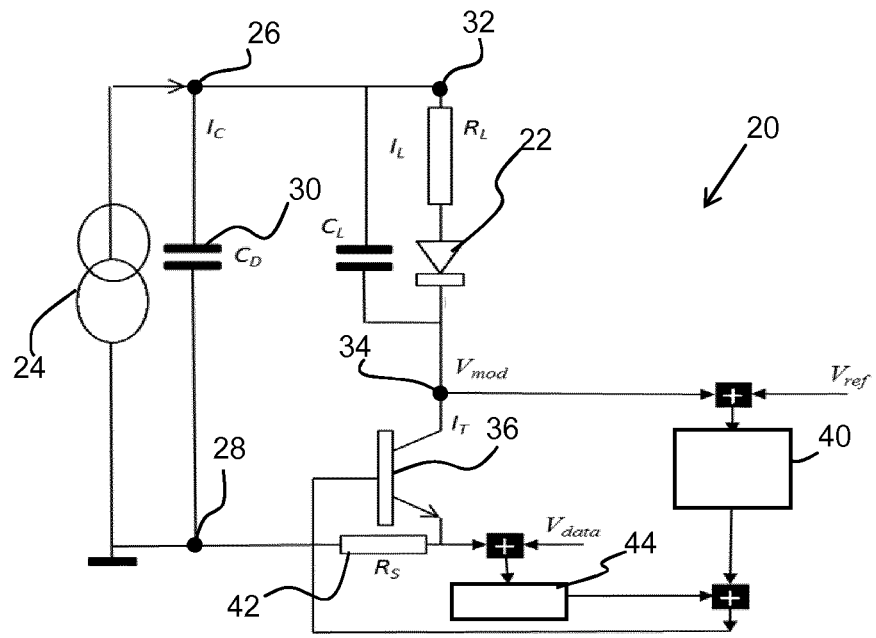
FIG. 3 shows an alternative design with two control loops.

FIG. 3 shows an alternative design with two control loops for the two feedback control paths.

The DC control loop comprises the low pass filter 40 as explained above.

The AC control loop is based on measurement of the current through the current modulating transistor 36 using a current sensing resistor 42 in series with the transistor 36 and LED load 22. A signal based on the current through the current modulating transistor 36 (in particular the voltage across the current sensing resistor) is compared with the data input signal Vdata, and the result is provided to one terminal of the low pass filter through a high pass filter 44.

In the DC control loop, a first difference voltage between the measured voltage Vmod and a reference voltage Vref is generated using an adder (with negative input for Vmod, i.e. a subtractor/comparators implemented using an operational amplifier). In the AC control loop, a second difference voltage between the sensed voltage across the resistor 42 and the data voltage is generated using a second adder (with negative input for the resistor voltage, i.e. a subtractor/comparator implemented using an operational amplifier). The high pass filtered result is then added into the DC control loop.

Thus, the AC control path may be implemented by directly coupling the modulating signal to the control input of the transistor thereby providing open loop feedforward control (FIG. 2), or by using a feedback loop that compares the actual transistor or LED load current with the modulating signal and feeding the difference via a feedback loop with a high pass filter (FIG. 3). The high pass filter blocks DC.

A combination of an open loop control for high speed data and a closed loop for lower frequency data (around 100 Hz to 300 Hz) may also be used to reduce flicker coming from the main power driver. For example, the measured LED current can be fed through a filter and then be applied to the modulator input signal.

The DC control loop keeps the transistor in a well-defined operational mode at the same time as keeping the losses low, for example operating in the linear mode, but close to the saturation point for low losses.

By operating in the linear mode, the transistor functions as a controllable current source. For example, if the voltage across the transistor increases, a larger portion of the driver current flows into the capacitor and thus less current flows through the LEDs.

The voltage reference Vref may be a constant voltage level. However, it may also be adaptive to ensure that it is just large enough to enable the desired modulation depth of the light output of the LED load. For example, the modulator can automatically adapt to an unknown number of LEDs, or to a variable current from the driver and enable a variable modulation depth to be implemented. This approach is explained in detail below with reference to FIG. 6.

In order to provide a given modulation depth (i.e. relative size of the modulation signal compared to the base signal) the voltage margin that the transistor should handle is linearly dependent on the number of LEDs in series with the transistor. The voltage margin is also linearly dependent on the current intensity, which is relevant for example for a dimmable driver. Finally, the voltage margin is also linearly dependent on the modulation depth.

In order to provide automatic configuration of the voltage reference Vref, the AC feedback loop may also use measurement of the LED optical output. In this case, non-linearity in the LED output can also be taken into account. During prolonged periods of no data modulation, the voltage across the transistor can be slowly reduced to almost zero. This limits the losses of the modulator when no modulation is applied.

Automatic adjustment of the reference voltage and voltage reduction across the transistor during long periods of no modulation may instead be achieved by the DC feedback loop, when the minimal peak voltage on the drain (or collector) of the transistor is used as the feedback parameter.

The reference voltage Vref may be dynamically adjustable so that it can be set according to different drive current, LEDs, and LED configuration. For fixed output and fixed LEDs luminaires, Vref can be set at a fixed value.

In order to have the most efficient modulation circuit, the voltage drop across the transistor should be as low as possible. The necessary voltage swing depends on number of LEDs, current intensity and modulation depth. However, for proper functioning of the transistor it is sufficient to ensure that its drain (or collector) voltage never reaches near 0V (or in practice the sum of the drain-source (or emitter-collector) voltage and the voltage on the sense resistor in the drain (or emitter) circuit should not drop close to zero).

A circuit that measures the minimal voltage on the source (or emitter) enables this control, by providing a feedback loop that regulates this minimal peak voltage to a reference Vref. In this way, the optimal efficiency is ensured for all variations in number of LEDs, current intensity and modulation depth, avoiding saturation of the transistor.

In the circuits described above, the transistor is controlled in an analog manner, functioning as an analog controllable current source. However, the transistor may instead be operated in a hard on-off mode at a fast switching rate. The transistor may in this way perform pulse width modulation. The AC and DC control loops may then be operated at frequencies sufficiently below the switching rate. The AC control loop will also filter the PWM signal.

By way of example, for a coded light injector circuits with pulse switch modulation at 16 kHz, the AC control loop should have a pass through band from a few hundreds of Hz to a few kHz (and below 16 kHz).

The AC control loop may also control the LED current at double the mains frequency i.e. 100 Hz or 120 Hz. In that case, ripple from the main driver is reduced. The circuit may then be used as a ripple reduction circuit.

Figure 4:
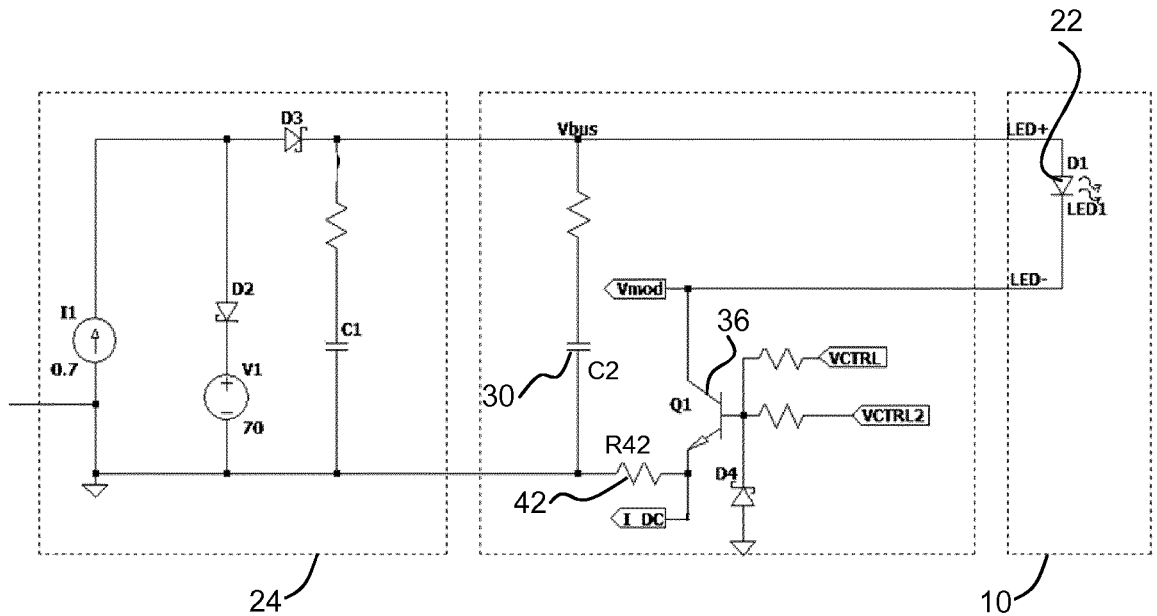
FIG. 4 shows a circuit model to enable the operation of the circuit to be simulated.

The operation of the circuit has been simulated. FIG. 4 shows a simulated circuit.

The LED driver 24 is simulated as an ideal current source I1, an overvoltage protection realized by diode D2 and voltage source V1, an output diode D3 and the output capacitor C1.

The coded light injector comprises the input capacitor 30 (C2) the transistor 36 (Q1) and the current sense resistor 42 (R42).

The low pass filtered version of the voltage Vmod is provided as VCTRL and the high pass filtered version of the comparison result of the sensed current (I_DC) and the data input is provided as VCTRL2 They are summed at the gate of the transistor 36.

Figure 5:
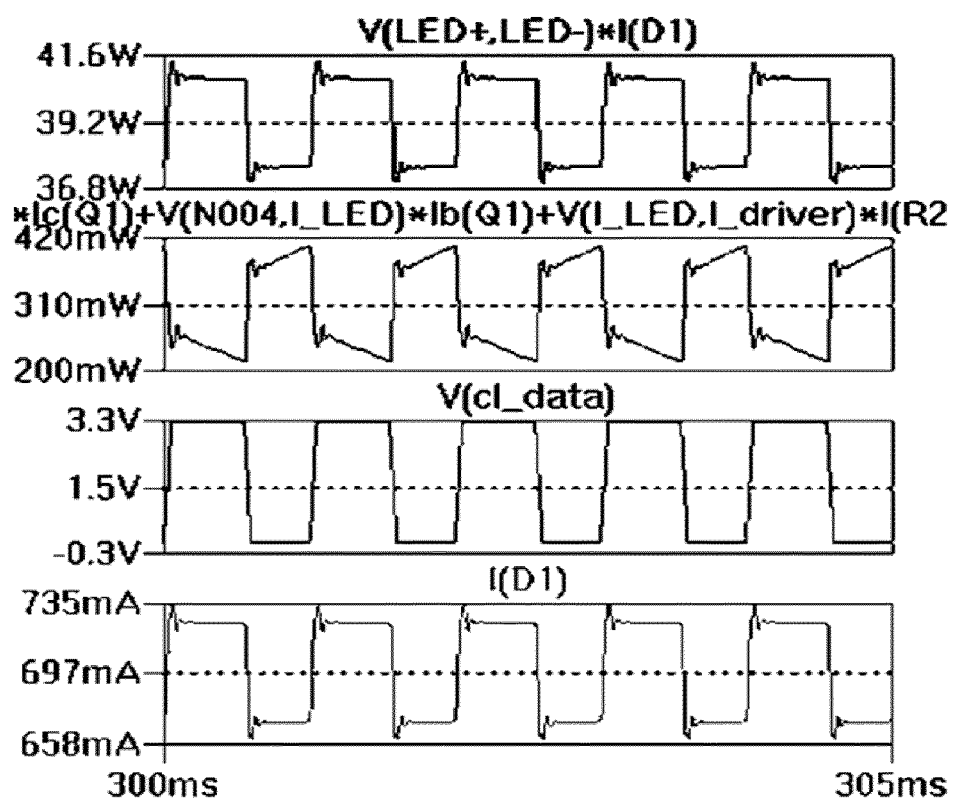
FIG. 5 shows simulation results.

FIG. 5 shows simulation results. The top plot shows the LED power. The second plot shows the power losses within the modulating transistor Q1. The third plot shows the data input and the bottom plot shows the LED current.

These simulation results show an average LED current of 700 mA, with power losses of 0.305 W on the modulating transistor compared to an average LED power of 39.326 W. The power supplied by the driver is 40 W. The simulation confirms how efficiently the circuit is able to operate.

FIG. 6 shows a second example of a circuit which makes use of detection of the minimum voltage across the current modulating element.

Figure 6A:
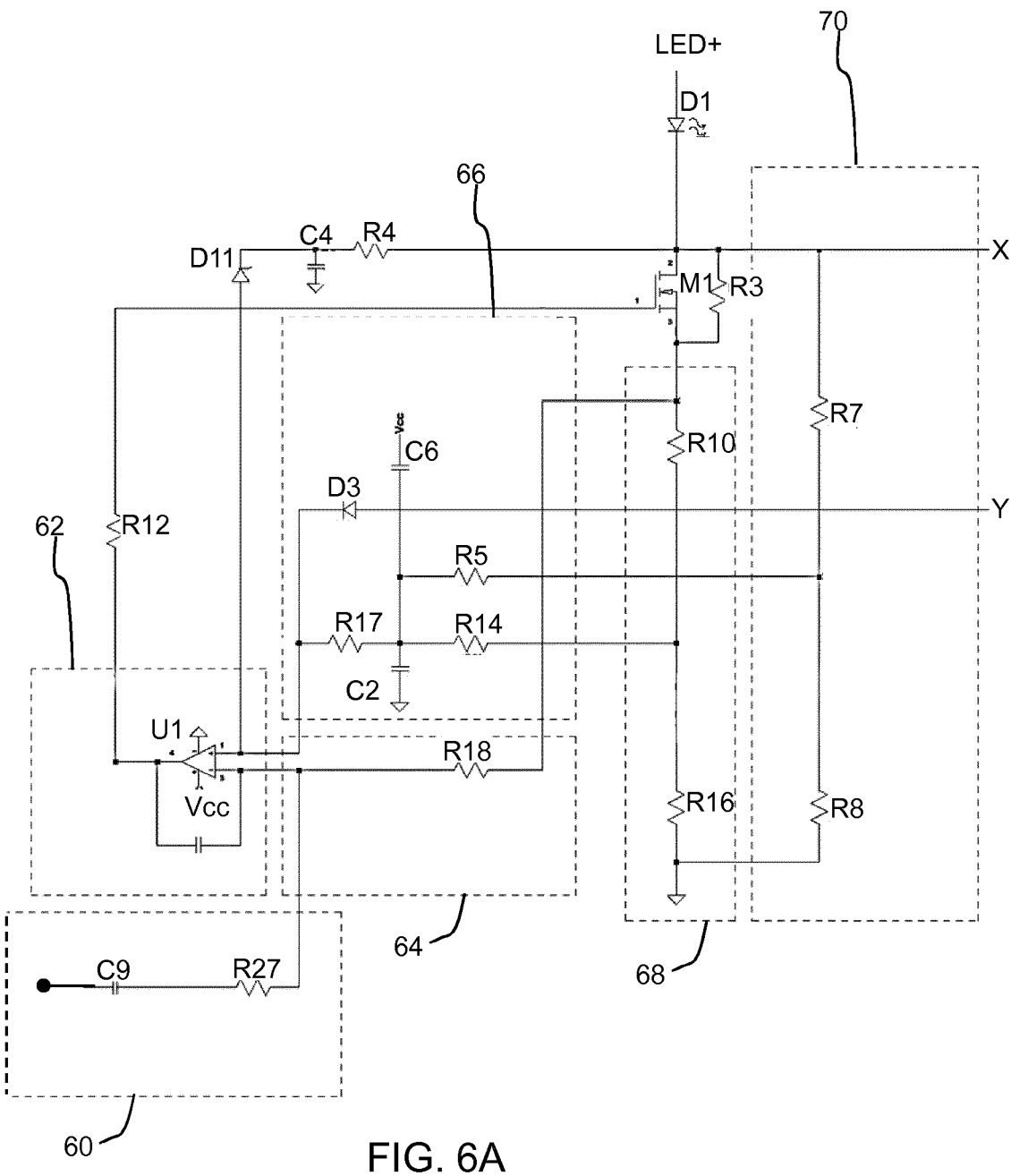
FIGS. 6A and 6B show an implementation in more detail of the circuit of FIG. 3.

FIG. 6A shows:
an amplitude modulation circuit 60;
a current regulation circuit 62;
a negative feedback path 64;
an average current setting circuit 66;
an LED current sense circuit 68; and
an average drain voltage detector circuit 70.

Figure 6B:
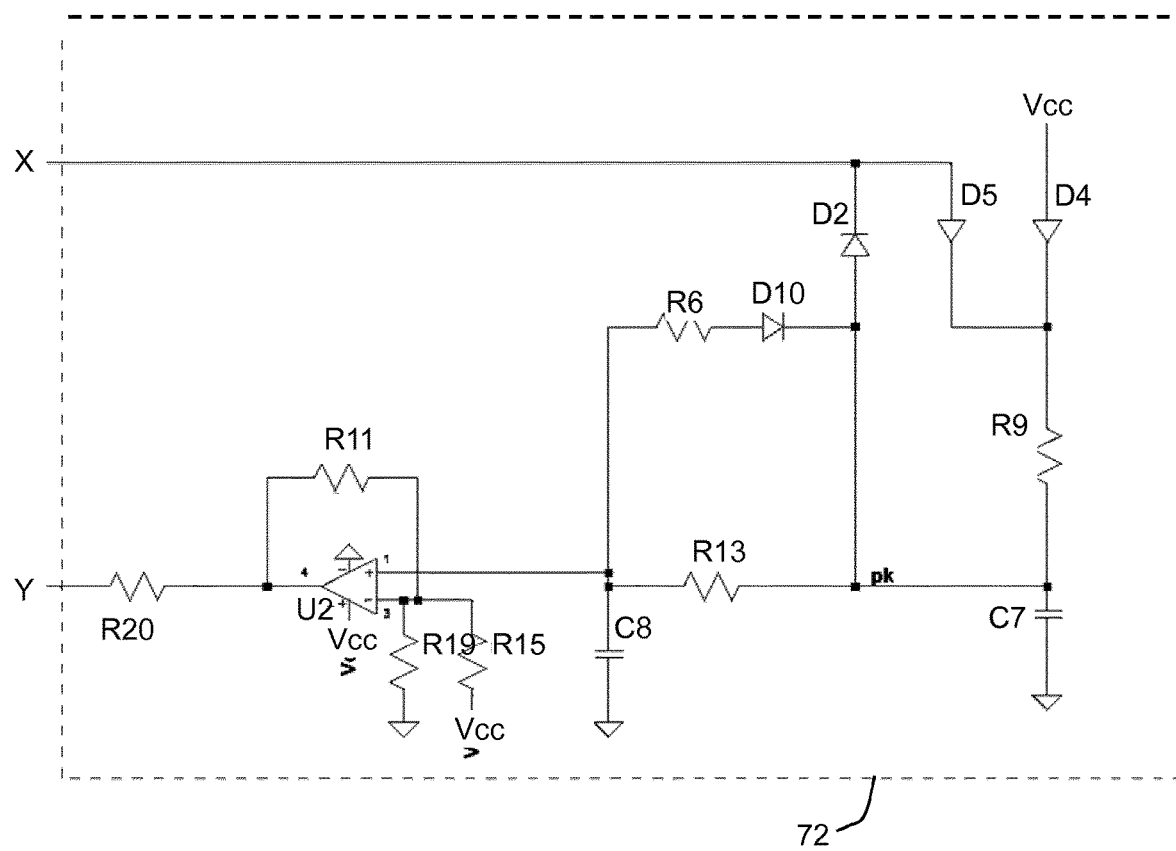

The circuit of FIG. 6A connects to the circuit of FIG. 6B at the nodes shown as X and Y. FIG. 6B shows a minimum peak detector 72.

The transistor M1 in FIG. 6A is the modulation transistor. The LED current is sensed via resistor R16 of the current sense circuit 68 and it is averaged via the low pass filter R14 and C2 within the average current setting circuit 66. The voltage across C2 represents the average LED current and is fed to the '+' input of the operational amplifier U1 within the current regulation unit 62.

The instantaneous LED current is sensed via R10 and R16 (R10 can be 0 ohm) within the LED current sense circuit. This signal is fed to the '−' input of the operational amplifier U1 in the current regulation unit 62. In this way the error signal (difference voltage between the '+' and '−') is the AC component of the LED current. The operational amplifier U1 and its feedback capacitor C10 forms a PI controller. The error signal is integrated and the output of the operational amplifier U1 provides a driving signal for the modulation transistor M1.

The drain voltage of the transistor M1 is sensed via the divider R7 and R8 in the average drain voltage detector circuit 70. This voltage is then averaged by C2 and R5 in the average current setting circuit 66. Therefore, only the average drain voltage is added to the feedback circuit. This is a slow reacting loop.

The data modulation is injected to the '−' input of the operational amplifier U1 via AC coupling of capacitor C9 within the amplitude modulation circuit 60. This adds the data modulation to the instantaneous current sense value. This is a closed loop modulation. The resistor R27 determines the modulation depth.

The feedback loop will suppress the low frequency modulation (e.g. 100 Hz ripple from the LED driver) due to low-pass filter in loop 66, while letting the high frequency modulation (the data) pass through a proper tuning of the bandwidth of the feedback loop 64. In this way the low frequency ripple is removed by the modulator and the LED current will not contain the low frequency ripple, rather only the high frequency modulation data.

The circuit also comprises a minimum peak detector shown in FIG. 6B. This circuit senses the valley of the drain voltage via a fast-reacting circuit. The drain voltage charges the capacitor C7 via D5 and R9. This circuit has long time constant. Furthermore the Vcc voltage also charges C7 and tries to keep C7 at high level. The discharging of C7 is directly via D2 and thus has a much faster time constant. In this way, the voltage across C7 will represent the valley voltage of the drain of the transistor M1 (i.e. the minimum peak). This signal is further filtered by R13, R6, C8 and D10. The voltage at capacitor C8 is a clean signal, representing the minimum peak voltage of the drain.

The operational amplifier U2 compares the minimum peak to a (constant) setpoint provided by the divider R15 and R19. The output of U2 is injected to the '+' input node of U1. In this way, the feedback loop will maintain the minimum peak of the drain voltage to a constant level. In this way, the average drain voltage is controlled in a dynamic way and depends on the LED current, LED type, modulation depth and electrolytic capacitance and age, etc.

This circuit shows how the voltage across the current modulating transistor is effectively controlled in a dynamic way, by instead using detection of a minimum valley current and setting this to a constant level.

The basic principle of the circuit of FIG. 6 is the same as for FIG. 4. The summation and subtraction of the signals are performed at the inputs of the operational amplifier U1. In FIG. 6, the data modulation is injected to the '−' input of the operational amplifier. For this reason, the data signal is first inverted.

The invention is of relevance generally to lighting applications in which data is modulated through light such as so-called coded light and so-called LiFi. Indoor positioning systems may for example make use of coded visual light communication.

The invention instead enables energy efficient current ripple reduction of a low-cost driver or ballast.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A current modulator circuit for modulating a drive current through a lighting load, comprising:
   a current modulating element for modulating the light output of the lighting load based on a data input signal, wherein the current modulating element is adapted to be connected in series with the lighting load; and
   a feedback system for controlling the current modulating element thereby to implement modulation of the current through the lighting load, wherein the feedback system comprises,
   a first feedback control path having as input a voltage across the current modulating element, wherein the first feedback control path comprises a comparator arrangement for comparing a measured voltage across the current modulating element with a reference voltage and a low-pass filter between an output of the comparator arrangement and a control input of the current modulating element; and
   a second feedback control path having as input the data input signal, wherein the second feedback control path is based on measurement of the current through the current modulating transistor, wherein the current through the current modulating transistor is compared with the data input signal, and the result is provided to one terminal of the low pass filter through a high pass filter.

2. A circuit as claimed in claim 1, wherein the current modulating element comprises a transistor.

3. A circuit as claimed in claim 1, wherein the measured voltage is the average voltage across the current modulating element.

4. A circuit as claimed in claim 1, wherein the measured voltage is a minimum peak voltage across the current modulating element.

5. A circuit as claimed in claim 1, wherein the current modulating element comprises a transistor and the reference voltage is selected such that the transistor operates at the limit of saturation.

6. A circuit as claimed in claim 1, wherein the data input signal is provided to one terminal of the low-pass filter.

7. A circuit as claimed in claim 1 wherein the high pass filter operates at a higher frequency than the low pass filter.

8. A circuit as claimed in claim 1, wherein the second feedback control path has another input signal based on measurement of the optical output of the lighting load.

9. A driving circuit for driving a lighting load, comprising:
   a driver for delivering a controlled current between first and second driver output terminals;
   an output capacitor connected between the first and second driver output terminals;
   a current modulator circuit as claimed in claim 1; and
   first and second driving circuit outputs, for connection to a lighting load.

10. A lighting circuit comprising:
    a driving circuit as claimed in claim 9; and a lighting load driven by the driving circuit connected between the first and second driving circuit outputs.

11. A method of modulating a drive current through a lighting load, comprising:

modulating the light output of the lighting load by modulating the current through the lighting load using a current modulating element, wherein the method comprises controlling the current modulating element using a feedback system which comprises a first feedback control path having as input a voltage across the current modulating element, wherein the first feedback control path compares a measured voltage across the current modulating element with a reference voltage and makes a low-pass filtering between an output of the comparator arrangement and a control input of the current modulating element, and a second feedback control path receives the data input signal as an input, and wherein the second feedback control path measures the current through the current modulating element, compares the current through the current modulating element with the data input signal, and provides the result to one terminal of the low pass filter through a high pass filter.

12. A method as claimed in claim 11, wherein the current modulating element comprises a transistor and the method comprises setting the reference voltage for the first feedback control path such that the transistor operates at the limit of saturation.

13. A method according to claim 11, wherein the high pass filter operates at a higher frequency than the low pass filter.

* * * * *